July 9, 1940.    F. T. O'GRADY    2,207,103
APPARATUS FOR PRINTING MOTION PICTURE FILMS
Filed Nov. 1, 1937    3 Sheets-Sheet 3
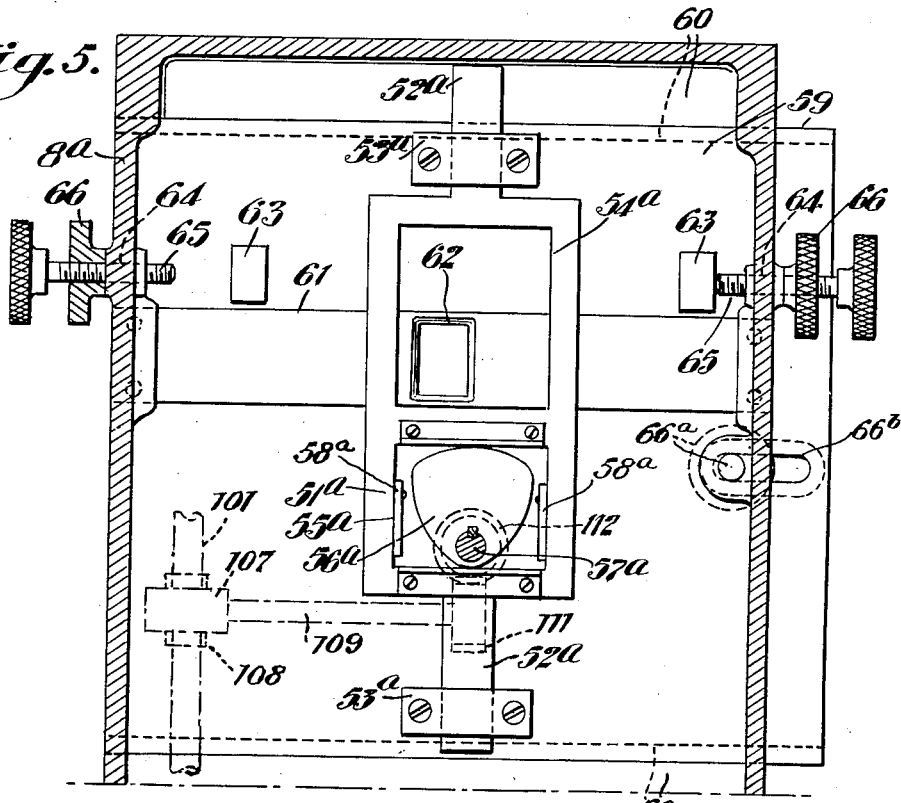
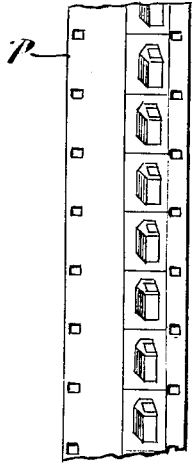
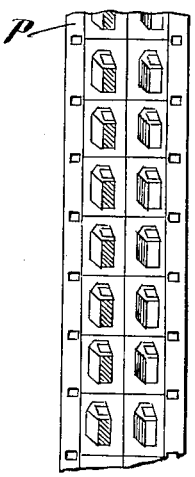
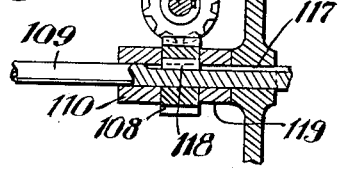
INVENTOR
Frederick T. O'Grady
BY
Davis & Davis
ATTORNEYS Patented July 9, 1940

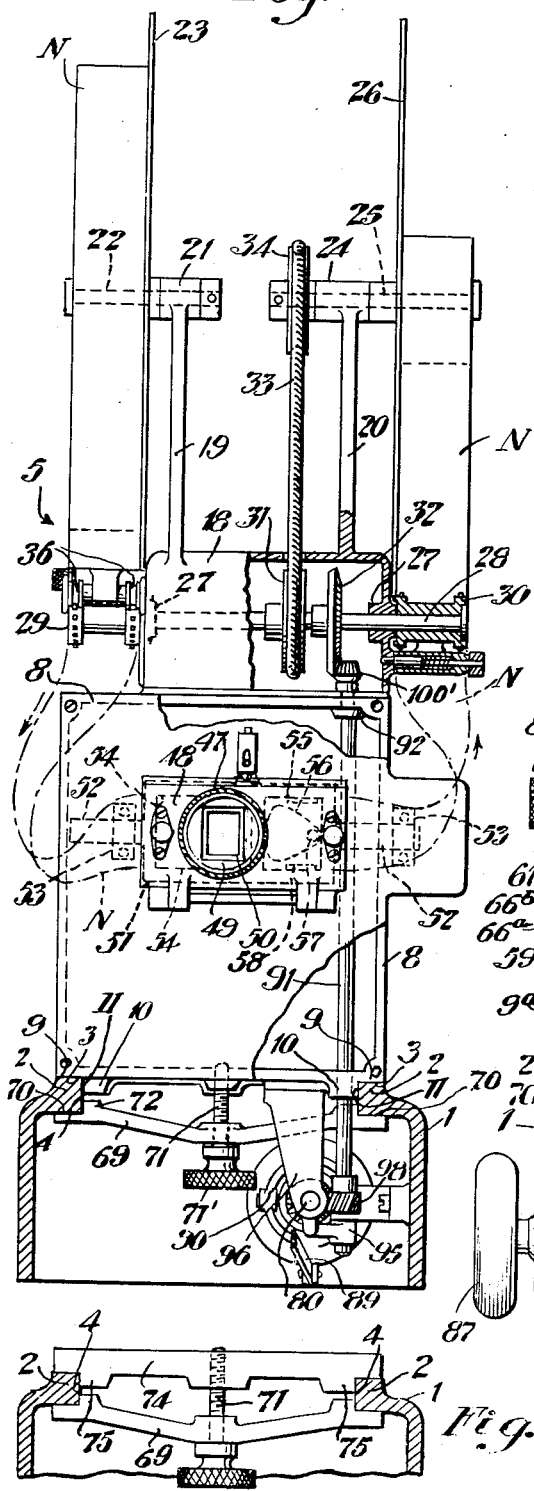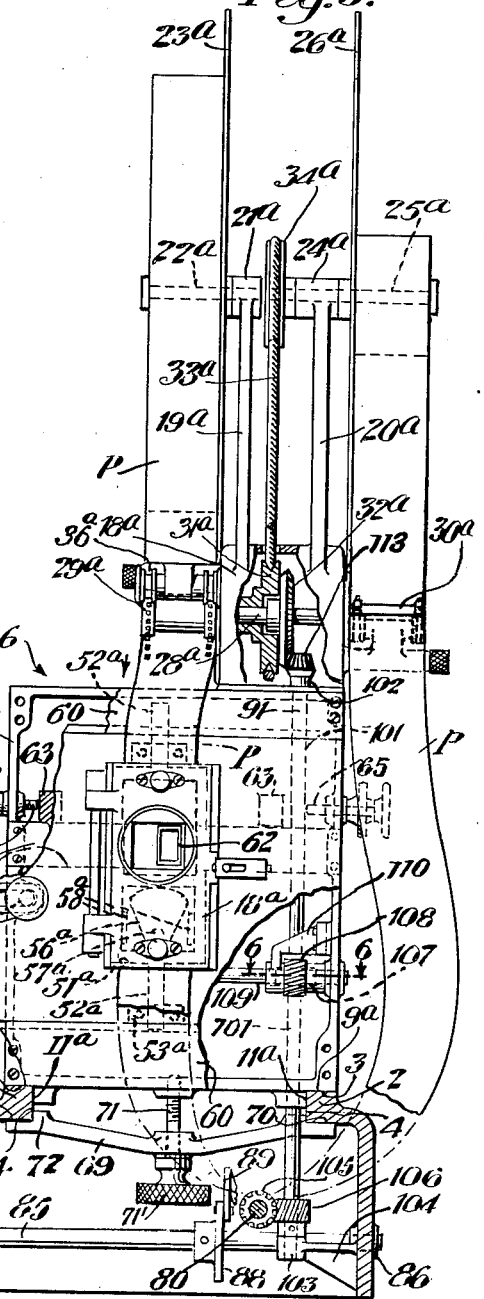

2,207,103

UNITED STATES PATENT OFFICE 2,207,103

APPARATUS FOR PRINTING MOTION PICTURE FILMS

Frederick T. O'Grady, Flushing, N. Y.

Application November 1, 1937, Serial No. 172,089

7 Claims. (Cl. 88—24)

Important objects of the present invention are to provide a motion picture film-printing apparatus of improved design; to provide such an apparatus for printing, from standard size sections borne by a negative film, pictures in reduced scale upon a positive film.

Other objects of the invention will appear hereinafter.

In the drawings,

Fig. 2 is an enlarged vertical section on the line 2—2 of Fig. 1, parts of the negative "head" being shown in section;

Fig. 3 is an end view of the apparatus partly in section and partly in elevation, looking toward the front of the positive "head;"

Fig. 4 is an enlarged detail section on the line 4—4 of Fig. 1;

Fig. 5 is a further enlarged vertical section on the line 5—5 of Fig. 1;

Fig. 6 is an enlarged section on the line 6—6 of Fig. 3;

Fig. 7 is an enlarged section on the line 7—7 of Fig. 1;

Fig. 8 is a face view of a portion of a positive film as it appears after the printing of the images of one negative film thereon; and Fig. 9 is a face view of a portion of the completely printed positive film.

Figure 1:
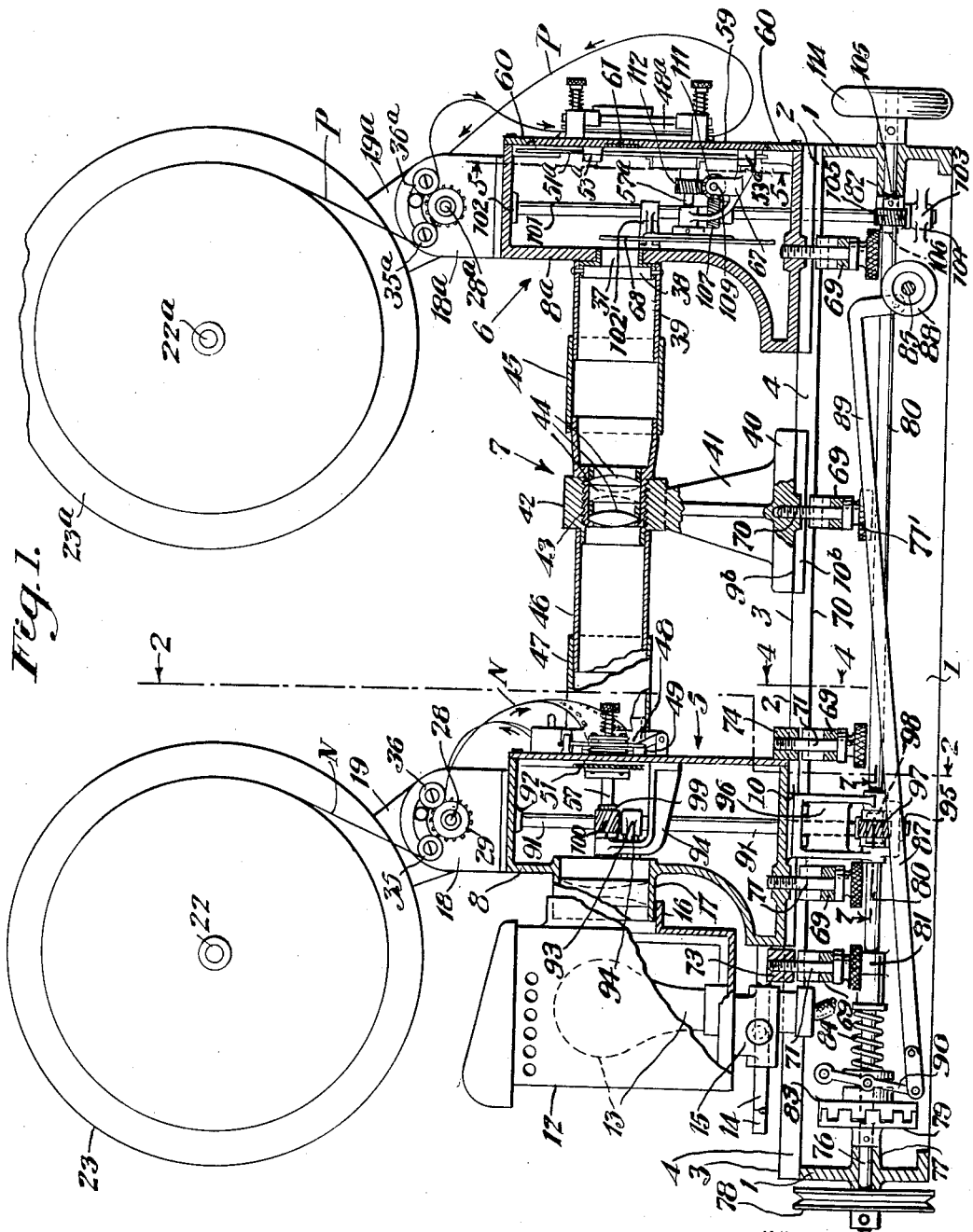
Fig. 1 is a side view of the apparatus, partly in section and partly in elevation.

In a certain method of color motion picture production a pair of negative films of a kind known in the art as "Bipack" films are exposed simultaneously in a camera. One of such negative films bears upon a face thereof a coating of emulsion responsive to red light and the other film bears a coating of emulsion responsive to green light. These films are arranged with their emulsion-coated faces in contact at the camera aperture for simultaneous exposure.

Thereby there are obtained two negative pictures which are duplicates except that one has a record of red and the other has a record of green. Assuming that the object photographed is a building with a red roof and green side walls, one of the negative films will have a record of red upon the roof section of its image and the other will have a record of green upon the side walls of its image. Successive exposures are made along the films and each picture fills an entire standard-size picture area.

The so-exposed negative films are separated and their pictures printed upon a positive film. In the printing operation one of the negative films is advanced intermittently in one direction across the path of printing light flux and the positive film is advanced intermittently in a direction at right angles to the direction of advance of the negative film and across the light flux, for printing the negative pictures and color records in succession upon and along the positive film in on-end arrangement. That is with each image swung around ninety degrees from upright position. Between the positive and negative films optical means are arranged to reduce the scale of the images projected from the negative films by the printing light flux so that each image can be printed within a portion only of a standard-size picture area upon the positive film. An entire series of images is thus printed upon the positive film along one side of a longitudinal central line. In a similar manner the pictures and color records borne by the other negative film are printed in reduced scale upon the positive film, along the opposite side of the longitudinal center line.

The positive film so prepared is intermittently advanced vertically downward through a standard projection machine and the pairs of images are disposed in succession for simultaneous projection of each pair. The images of the pair are projected through separate sets of projection lenses and the latter are arranged to combine or superimpose the two images in optical register with each other for projection as a single image upon a viewing screen. In their passage to the viewing screen the projection light rays are bent to swing the projected images around ninety degrees for projection in upright position upon the screen. In their passage to the viewing screen the pair of projected images are also directed through a pair of color filters arranged alongside of each other. The image projected from the film picture bearing the red color record is projected through a red color filter and the image projected from the film picture bearing the green color record is projected through a green color filter to thereby impart to the single image upon the viewing screen the said several colors of the object photographed.

The present invention provides apparatus for printing, from Bipack films, images in reduced scale and in on-end arrangement upon a positive film in the manner just described.

The apparatus includes a base 1 formed of an elongated frame-like casting open at its upper and lower sides. At its upper side the base is formed with a pair of parallel guide ribs 2 running longitudinally of the base and having smooth, horizontal upper surfaces 3 and smooth vertical inner surfaces 4. The surfaces 3 are in the same horizontal plane, and the surfaces 4 are in parallel vertical planes and form the opposite sides of a wide slot extending the length of the base. The under side of the base is flat and parallel to the surfaces 3. The base forms a support for a negative film-handling unit 5 which will be referred to as the "negative head," a positive film-handling unit 6, referred to as the "positive head," and an optical unit 7 disposed between the film-handling units. The units 5 and 7 are adjustable along the base. The negative head also bears a printing light source.

The negative head 5 includes a box-like metal casing or housing 8 formed at its under side with flat, smooth marginal surfaces 9 to rest upon the upper surfaces 3 of the base. Guide ribs 10 are also formed upon the under side of the casing and have smooth vertical outer surfaces 11 disposed to slidably engage the base surfaces 4. The surfaces 9 and 11 are of material length for firm, accurate support of the negative head in operative position. At its rear side, that is the left with reference to Fig. 1, the casing 8 bears a printing light unit comprising a casing 12 containing an electric lamp 13. For support of the lamp casing the casing 8 bears a pair of rigid, parallel rods 14 projecting rearward, and the lamp casing has at its under side a supporting bracket 15 with bores slidably receiving said rods. The forward side of the lamp casing has a light-projection aperture defined by an annular flange 16 which telescopes over a tubular section 17 formed on the rear side of the casing 8 and defining a light-projection aperture therein. At its forward side the casing 8 bears a film-advancing mechanism referred to hereinafter.

A smaller casing 18 is borne by the upper side of casing 8 and in turn bears upwardly and rearwardly extending bracket arms 19 and 20. A bearing 21 on the upper end of arm 19 supports a horizontal stub shaft 22 upon which a let-off spool 23 for a negative film N is rotatably and removably mounted. A bearing 24 borne by the upper end of bracket arm 20 supports a shaft 25 in horizontal axial alinement with shaft 22. A film take-up pulley is keyed to and removably mounted upon shaft 25. At its opposite sides the casing 18 has bearings 27 supporting a shaft 28 parallel to the said spool shafts. Shaft 28 extends through casing 18 and beyond the opposite sides thereof and has film-advancing sprocket wheels 29 and 30 affixed to its end portions. Within the casing a grooved pulley 31 and a bevel gear 32 are fixed to shaft 28. A spring belt 33 makes a driving connection between pulley 31 and a pulley 34 fixed to the shaft 25 of the take-up spool. The power transmission for driving shaft 28 will be described hereinafter. At the opposite sides of casing 18 there are also mounted film-guiding and pressing rollers 35 and 36 to train the film around the sprocket wheels.

Much of the structure of the positive head 6 is similar to that of the negative head. It includes a similar casing 8ª similarly mounted upon the base 1 with under side surfaces 9ª resting upon the base surfaces 3, and rib surfaces 11ª engaging the base surfaces 4. A casing 18ª similar to casing 18 but of less width, is mounted upon the casing 8 and bears a mounting 19ª—21ª—22ª, for a let-off film spool 23ª similar to the mounting for the spool 23. A film take-up spool 26ª is supported by a mounting 20ª—24ª—25ª similar to the mounting for the spool 26.

Film-advancing sprocket wheels 29ª and 30ª are fixed to a shaft 28ª mounted similarly to shaft 28 and similarly provided with a grooved pulley 31ª having a driving belt connection 33ª with a pulley 34ª fixed to the shaft 25ª of the take-up spool 26ª. Shaft 28ª also has a bevel gear 32ª fixed thereto. The rear wall of the casing 8ª has an aperture 37 defined by an annular member 38 fitted within a hole in said wall. Outside of the wall said annular member has its diameter enlarged and telescoped over it is a tubular member 39, for connection with the optical unit 7. Other features of the positive head will be described hereinafter.

The optical unit 7 includes a base 40 mounted upon the base 1 similarly to the casings 8 and 8ª having flat under side margins 9ᵇ to rest slidably upon the base surfaces 3, and ribs 10ᵇ to engage the base surfaces 4. A pedestal 41 is formed upon the base of the optical unit and has, rigid with its upper end, an internally screw-threaded annulus 42. A lens unit is secured within said annulus and includes an externally threaded tubular member 43 screwed into the annulus and containing a lens assembly 44 designed to reduce the scale of each image projected therethrough from the negative film N to the positive film P. The forward end of the tubular member 43 telescopes within one end of a sleeve or muffet 45 whose opposite end telescopes over the tubular member 39 connected to the positive head. The annulus 43 has at its rear side an annular flange telescoped within a tubular member 46 over the rear end of which there is telescoped a sleeve or muffet 47 for connecting with the negative film head.

The negative film-advancing mechanism is so arranged upon the front wall of the casing 8 as to advance the film N along a horizontal line, from left to right with reference to Fig. 2. Said mechanism includes a film gate plate 48 hinged at its lower edge to the casing 8 to swing to open and closed positions on a horizontal axis. At the rear of the gate plate there are mounted the usual opposed plates or pads one of which is spring pressed toward the other to flatten therebetween the portion of the film disposed at the aperture in the front wall of the casing. Said plates or pads have registering apertures to expose one of the film pictures in optical alinement with the light projection aperture at the rear of casing 8, the lens assembly 44 and the aperture 47 of the positive head. One of said plates is indicated at 49 with its exposure aperture 50 in register with the exposure aperture in the film gate plate. The film-pressing plates or pads are common in the art and it is thought to be unnecessary to show and describe them in detail.

The film is advanced between said plates by a mechanism including a frame-like shuttle 51 having shanks 52 projecting horizontally from its opposite ends and slidably fitted in guides 53 borne by the frame 8. Thereby the shuttle is mounted for horizontal reciprocation. It has an aperture 54 large enough to remain in constant register with the film-exposure apertures and an aperture 55. At opposite edges of aperture 55 the shuttle bears parallel thrust-receiving strips engaged by a rotary cam 56 to reciprocate the shuttle. Said cam is fixed to a shaft 57 rotatably mounted in bearings borne by the casing 8. Film-feeding claws 58 are mounted upon the shuttle to engage in the sprocket holes of the film and advance the film on each stroke of the shuttle from left to right, with reference to Fig. 2, for advancing the film pictures successively into register with the exposure aperture 50. The film gate plate 48 has an annular flange around its exposure aperture and telescoped within the tubular member or sleeve 47 connecting with the optical unit.

The positive film-advancing mechanism is borne by a plate 59 mounted at the front of the positive head casing 8ª, in a vertical plane at right angles to the optical axis of the apparatus. At its upper and lower edges said plate is supported for horizontal sliding adjustment by guides 60 on the front of the casing 8ª. At the rear of said sliding plate there is a narrow aperture plate 61 extending horizontally and disposed in a plane parallel to plate 59. At its opposite ends the plate 61 is secured to the casing 8ª in a fixed position. The plate has an exposure aperture 62 whose shape and size correspond to that of a reduced scale picture to be printed on the film P at one side of the longitudinal center line of the film. This aperture is constantly centered on the optical axis of the apparatus. The positive film-advancing mechanism is borne by the sliding plate to slide horizontally with it and is arranged to advance the film vertically downwardly. By shift of the plate therefore said mechanism and the portion of the film engaged by it may be adjusted to register reduced picture receiving areas at opposite sides of said longitudinal center line of the film selectively with the fixed exposure aperture 62. Stop means are provided to limit the horizontal adjustments of plate 59. At its rear face said plate has rigid stop lugs 63 spaced across the plate. The opposite side walls of the casing 8ª have threaded apertures 64 through which are screwed stop screws 65 having knurled heads at their outer ends. These screws are engageable selectively by the stop lugs 63 and they are adjusted to permit just the required shift of the plate. When so adjusted the screws may be locked by knurled lock nuts 66. A headed clamping screw 66ª is manually operable to lock the plate in its adjustments. Said screw is passed through a horizontal slot 66ᵇ in the plate and screwed into a threaded hole in the casing 8ª.

The positive film-advancing mechanism is similar to the negative film-advancing mechanism except that it is arranged to advance the film vertically downward. It includes a film gate plate 48ª hinged at one side edge to the slidable plate 59 for swinging about a vertical axis to open and closed positions. It has a picture aperture large enough to remain in register with the fixed aperture 62 in the different adjustments of the slidable plate. The usual film presser plates are arranged back of the film gate plate and also have apertures large enough to remain in constant register with the fixed aperture 62. A frame-like shuttle 51ª has shanks 52ª projecting vertically from its opposite ends and slidably supported by guides 53ª borne by the sliding plate 59. Thereby the shuttle is mounted for vertical reciprocation on said plate. The shuttle has an aperture 54ª large enough to remain in constant register with the fixed aperture 62, and an aperture 55ª. At opposite sides of aperture 55ª the shuttle bears parallel thrust-receiving strips engaged by a rotary cam 56ª to reciprocate the shuttle. Said cam is fixed to a shaft 57ª rotatably supported by a bearing bracket 67 secured to the rear face of plate 59. Said shaft also has a shutter 68 fixed to rotate with it, within the casing 8ª, to cut off the printing light flux from the fixed aperture 62 and the positive film P during the period of picture change. For advancing the film P intermittently the shuttle bears feed claws 58ª to enter the sprocket holes of the film and pull the film downward one picture space upon each downward movement of the shuttle. The shuttle and claw feed mechanisms for the positive and negative films will comprise the subject matter of a separate patent application.

The positive and negative head units and the optical unit are all adjustable along the base 1 to arrange them in proper operative correlation, and clamping means are provided to maintain their adjustments. Beneath each of said units there is a transverse clamping bar 69 formed so that its end margins will abut flat, downwardly facing surfaces 70 of the base 1. At the middle of its length said bar has an aperture through which a clamping screw 71 extends. The upper end of said screw is screwed into a threaded aperture at the under side of the unit, and the lower end of the screw has a knurled head 71' and an abutment to engage the under side of the clamping bar. By tightening the screw the bar is forced against the surfaces 70 and the base of the unit is forced against the track surfaces 3 of the base 1 to thereby lock the unit to the base. Ribs 72 on the bar engage the base surfaces 11 to prevent the bar from turning.

As previously mentioned, when Bipack negative films are employed in photographing their emulsion coated surfaces are disposed in contact at the camera exposure aperture. Therefore one film, say the one with the emulsion responsive to red light, will have the emulsion disposed upon its rear face and the other film will have its emulsion upon its front face. The two films are employed separately in the printing of the positive film P and, for correct focusing, it is desirable that the emulsion coated faces of the two films be disposed in the same position successively with reference to the lenses and the positive film. In order to obtain this, provision is made for fine adjustment of the negative head along the optical axis of the printing apparatus. Mounted upon the base 1, in positions fore and aft of the base portion of the casing 8, are two metal stop cleats 73 and 74. Each cleat has flat, smooth end margins at its under side to rest upon the track surfaces 3 of the base. At its under side the cleat also has guide ribs 75 to engage the guide surfaces 4 of the base. The cleats are slidably adjustable along the base, and in order to hold each in an adjusted position there are a clamping bar 69 and screw 71 similar to those employed for clamping the negative and positive film head units and the optical unit to the base. The cleats are clamped upon the base in positions spaced apart a distance exceeding the length of the base portion of the casing 8 by the thickness of the film N exclusive of the emulsion thereon. The negative head is then adjustable fore and aft between the cleats to the degree of the film thickness to dispose the portion of either negative film located at the film gate in the proper position along the optical axis.

The film-advancing mechanisms of the negative and positive heads, and the shutter 68, are driven in unison by a power transmission mechanism including a short horizontal drive shaft 76 rotatably supported by a bearing 77 borne by the rear end wall of the base 1. Outside of the base said shaft has fixed to it a grooved pulley 78 for a belt drive connection with a power source, not shown. Within the base a clutch member 78 is fixed to the shaft. A horizontal driven shaft 80 within the base is supported in a position coaxial with shaft 76 by a bearing 81 borne by the base intermediate the length thereof and by a bearing 82 borne by the forward end wall of the base. At its rear end shaft 80 bears a clutch member 83 fixed to rotate upon the shaft but slidable therealong to clutch to the member 79 and release therefrom. The clutch member 83 is constantly urged toward the driving clutch member 79 by a spring 84. Near the forward end of the base a shaft 85 extends crosswise within the base and is rotatably supported by bearings 86 borne by the opposite side walls of the base. Outside of the base the shaft 85 has a knob 87 fixed to it for rotating it manually. Within the base a disk 88 is fixed to the shaft, and a rod 89 is pivotally connected at one end to said disk and extends rearward within the base. At its rear end said reach rod is pivotally connected to the lower end of a clutch-shifting lever 90 whose upper end is pivotally connected to a shaft or pintle borne by the base. Between its ends the clutch shifting lever is operatively connected to the clutch member 83. Thereby the clutch member 83 may be disengaged from the driving clutch member 79 by turning the knob 87. The forward end of the reach rod 89 is so formed and connected to the disk 88 as to enable the reach rod to be thrown on dead-center to hold the clutch released.

For driving the film-advancing devices of the negative head a shaft 91 extends vertically through the casing 8 and is rotatably supported by an upper bearing 92 borne by the upper wall of the casing, an intermediate bearing 93 borne by a bracket 94 affixed to the interior of the casing; and a lower bearing 95 borne by a depending bracket 96 affixed to the under side of casing 8. Bracket 96 is yoke-like and contains a spiral gear 97 keyed to the horizontal main shaft 80. A spiral gear 98 in mesh with gear 97 is keyed to the vertical shaft 91. Another spiral gear 99 is keyed to said vertical shaft and meshes with a spiral gear 100 keyed to the shaft 57 bearing the shuttle-reciprocating cam 56. Said shaft 57 is supported by a bearing borne by the bracket 94. A bevel gear 100' is keyed to the upper end of shaft 91 and meshes with bevel gear 32 keyed to shaft 28 which also bears the driving pulley for the film take-up spool 26 and the film-feeding sprocket wheels 29 and 30. By means of the said shafting and gearing rotation of the shaft 80 will cause operation of the film-advancing mechanism at the feed gate, rotation of the film-feeding sprocket wheels 29 and 30 and rotation of the take-up spool.

The driving connections between the main shaft 80 and the positive film-moving devices and the shutter 68 include a shaft 101 extending vertically through the casing 8a and rotatably supported by an upper bearing 102, an intermediate bearing borne by a bracket 102' fixed to the interior of the casing 8a, and a lower bearing 103 borne by a bracket 104 on the interior of the base 1. A spiral gear 105 fixed to the main shaft 80 meshes with a spiral gear 106 fixed to the vertical shaft 101. A spiral gear 107 fixed to shaft 101 meshes with a spiral gear 108 fixed to a transverse horizontal shaft 109 journalled at one end in a bracket 110 affixed to the interior of the casing 8a, and journalled at its opposite end in a bearing borne by the bracket 67 affixed to the sliding plate 59. Said shaft 109 also has a spiral gear 111 fixed to it and meshing with a spiral gear 112 fixed to the shaft 57a which bears the shuttle-reciprocating cam 56a and the shutter 68. A bevel gear 113 is fixed to the upper end of shaft 101 and meshes with bevel gear 32a mounted upon the transverse shaft 28a which also bears the driving pulley 31a for the take-up spool 26a and the film-moving sprocket wheels 29a and 30a. By the shafting and gearing just described the positive film P will, by rotation of shaft 80, be advanced intermittently across the fixed exposure aperture 62 in unison with the intermittent advance of the negative film N across the exposure aperture 50 of the negative head. These apertures are in constant optical alinement.

When it is desired to operate the film-feeding mechanisms of the positive and negative heads by hand instead of by the power source, through the pulley 76, the clutch member 83 is retracted to release position by rotation of the knob 87. Then the shaft 80 is manually rotated by turning a knob 114 fixed to the shaft and located at the front end of the base 1.

The positive head when once adjusted in proper position, with the bearing for the vertical shaft 101 in proper alinement, remains in said position. The negative head, however, is adjustable along the base. In order to maintain its driving connection with the main shaft 80 in the different adjustment the shaft, as shown in Fig. 7, is provided with elongated key-way 115 and the gear 97, constrained to shift with casing 8 by the bracket 96 borne by the casing, has a key 116 slidable in said elongated key-way to maintain the driving connection.

The mechanism for advancing the positive film P across the fixed aperture 62, and the mechanism for rotating the shutter 68 are both borne by the laterally slidable plate 59 and are shiftable with it. In order to maintain their driving connection with the main shaft 80 the transverse shaft 109 has an elongated key-way 117, as shown in Fig. 6. The gear 108 has a key 118 slidably fitted in said keyway and is held against axial movement by the bracket 110 and a spacer 119 between the gear and the adjacent wall of the casing 8a. The shaft 109 may then shift along with plate 59 and slide through the gear 108 while remaining in driving connection with it. Since the shaft 109 is in driving connection with the film-advancing shuttle and the shutter 68 a constant driving connection for them is maintained in the different adjustments of plate 59.

Assume that in the printing operations there is first employed the exposed Bipack negative film bearing the pictures with the records of the color red and the emulsion is upon the rear face of the film. The negative head is first adjusted forward along the optical axis to bring the forward side of its casing 8 against the forward stop cleat 74, and the casing is then clamped to the base. The slidable plate 59 of the positive head is also adjusted laterally to position the positive film for receiving the printing light flux, projected through the reduced, fixed aperture 62, upon a picture area of the film located at one side of the longitudinal center line. As shown in Fig. 3, the plate is shifted to the left so that the projected light will be received at the right of said center line.

Having made said adjustments of the negative head and the sliding plate 59, and having adjusted and clamped the optical unit 7 for correct focusing, the shaft 80 is driven to advance the films N and P intermittently and in unison. The negative film N is advanced horizontally across the exposure aperture 50 and the positive film P is advanced vertically downward. The images projected from the negative film are reduced in scale by the lenses of the optical unit and projected through aperture 62 and in on-end arrangement upon the positive film at one side of the longitudinal center line. At the conclusion of this printing from said one of the two Bipack films the positive film will appear as in Fig. 8 with all of the printed pictures having records of the color red arranged at one side of the center line.

The Bipack negative film having pictures with photographed records of the color green is next employed to complete the printing of the positive film. Assuming that said negative film has the emulsion upon its front face, the negative head is adjusted rearward along the optical axis to bring the rear face of its casing 8 in contact with the rear stop cleat 73 and the casing is then clamped in position. This will dispose the emulsion face of the film in the same position as that of the film first employed. The slidable plate 59 of the negative head is shifted to the right, with reference to Fig. 3 and the same positive film is again advanced through the positive head in unison with the second negative film, and the successive standard size negative pictures are reduced in scale to the same degree as before and projected through the aperture 62 and upon the positive film in on-end arrangement at the opposite side of the center line. The completely printed positive film will appear as in Fig. 9 with a series of pairs of side by side pictures, each pair occupying a standard size picture area and having, one a printed record of the color red, and the other a printed record of the color green.

While I have disclosed a very satisfactory apparatus for performing the said film-printing operations some of the structural details are susceptible of variation without departing from the spirit of the invention. Therefore I do not wish to be limited strictly to this disclosure but reserve the right to make such modifications, as will lie within the scope of the appended claims.

What I claim is:

1. Motion picture film-printing apparatus for printing by projection of pictures from negative films upon different portions of the individual picture areas of a positive film and comprising optical means for projection of the negative pictures, a plate formed with a projection aperture through which aperture the pictures are projected upon the positive film by said optical means, means supporting said aperture plate in a fixed position with the aperture constantly centered on the optical axis of said optical means, the aperture being of a size and shape similar to that of a reduced scale picture to be printed on the positive film at one side of the longitudinal center line of the film, mechanism for advancing the positive film intermittently across said optical axis, and means for supporting said film-advancing mechanism and an associated portion of the positive film for adjustment together crosswise of said optical axis and said aperture, for registering different portions of a positive film with said aperture and maintaining said mechanism and film in operative relation to each other.

2. Film-printing apparatus according to claim 1, characterized in that there is power transmission mechanism for driving the said film-advancing mechanism, and there is means for maintaining said transmission mechanism in operative connection with the film advancing mechanism in the said different adjustments of the latter.

3. Motion picture film-printing apparatus for printing by projection of pictures from negative films upon different portions only of the individual picture areas of a positive film and comprising optical means for projection of the negative pictures, a plate formed with a projection aperture through which the said pictures are projected upon the positive film by said optical means, and mechanism for advancing the positive film intermittently across the axis of said optical means, characterized in that said aperture is of a shape and size similar to that of a reduced scale picture to be printed on the positive film at one side of the longitudinal center line of the film, there is means supporting said aperture plate in a fixed position to maintain the aperture in constant optical alinement with said optical means, there is a film gate structure supporting a portion of the positive film in operative relation to said film-advancing mechanism, said mechanism and gate structure are embodied in a unit, and there is means supporting said unit for adjustment crosswise of said optical axis and said aperture, for registering different portions of a picture area of the positive film with said aperture while maintaining said operative relationship between the film-advancing mechanism and said film portion.

4. Motion picture film-printing apparatus for printing by projection of pictures from negative films upon different portions only of the individual picture areas of a positive film and comprising optical means for projection of the negative pictures, a plate formed with a projection aperture through which the said pictures are projected upon the positive film by said optical means, and mechanism for advancing the positive film intermittently across the optical axis of said optical means, characterized in that said aperture is of a shape and size similar to that of a reduced scale picture to be printed on the positive film at one side of the longitudinal center line of the film, there is means supporting said aperture plate in a fixed position to maintain the aperture in constant optical alinement with said optical means, the said film-advancing means is embodied in a unit and includes a shuttle reciprocable in the unit and having claw means to engage the sprocket holes of the positive film for film advance, said unit includes means to support a portion of the positive film in operative relation to the film-advancing mechanism, and there is means supporting said unit for adjustment crosswise of said optical axis and said aperture, for registering different portions of a picture area of the positive film with said aperture while maintaining said operative relationship between the film-advancing mechanism and said film portion.

5. Film-printing apparatus according to claim 4, characterized in that there is a power transmission mechanism for driving the said shuttle and held against said transverse shift with the said unit, and there is means for maintaining said transmission mechanism in operative connection with the shuttle in the said different adjustments of the unit.

6. Film-printing apparatus according to claim 1, characterized in that there are an unwinding spool and a winding spool for the positive film, and sprocket wheels for withdrawing the film from the unwinding spool and feeding it to the winding spool, and said spools and sprocket wheels are arranged in a correlation with the positive film-advancing mechanism to train the film in a loop including said portion of the film in operative relation to the film-advancing mechanism and affording slack in the film for the said adjustment of said film portion with the advancing mechanism.

7. Film-printing apparatus according to claim 1, characterized in that there are an unwinding spool and a winding spool for the positive film, and sprocket wheels for withdrawing the film from the unwinding spool and feeding it to the winding spool, said spools are mounted in opposed end-to-end relation to each other, said sprocket wheels are coaxially arranged and affixed to a common driving shaft located between the film spools and the said positive film-advancing mechanism, and said sprocket wheels are correlated with the film-advancing mechanism to train the film in a loop including the said portion of the film operatively associated with the film-advancing mechanism and affording slack for the said adjustment of said film portion with the film-advancing mechanism.

FREDERICK T. O'GRADY.